Figure 1:
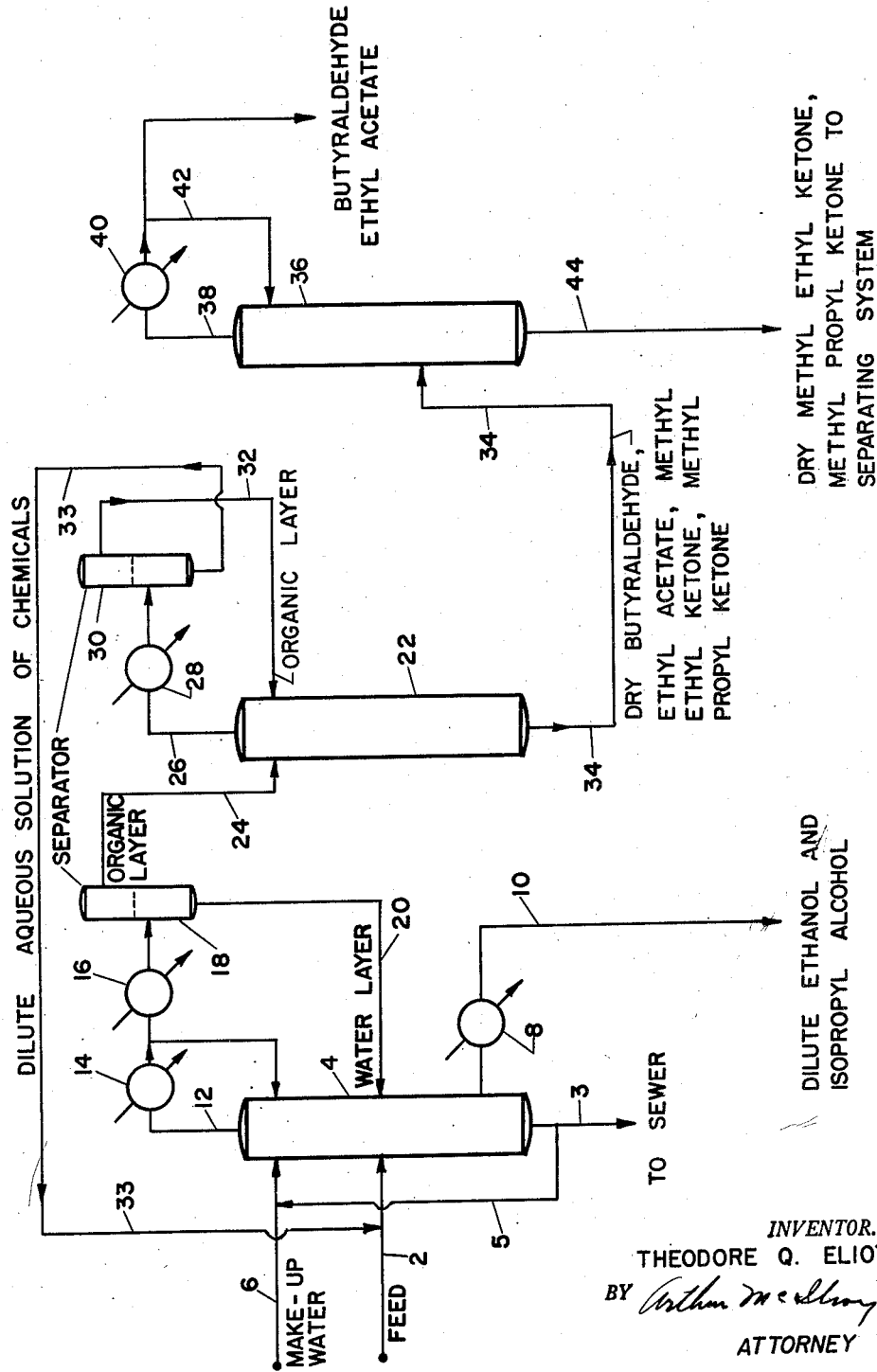

Jan. 7, 1958 T. Q. ELIOT 2,819,205
PURIFICATION OF METHYL ETHYL KETONE
Filed Dec. 1, 1954 2 Sheets-Sheet 1

INVENTOR.
THEODORE Q. ELIOT
BY
ATTORNEY

2,819,205
PURIFICATION OF METHYL ETHYL KETONE

Theodore Q. Eliot, Tulsa, Okla., assignor to Pan American Petroleum Corporation, a corporation of Delaware Application December 1, 1954, Serial No. 472,377

6 Claims. (Cl. 202—39.5)

My invention relates to a method for separating certain organic compounds from one another and from complex organic mixtures in which at least some of the components thereof form azeotropes with one or more of the constituents present therein. More particularly, it relates to the separation of methyl ethyl ketone and, in some instances, methyl propyl ketone from difficultly separable organic impurities, such as butyraldehyde, ethyl acetate and the like.

Mixtures of the type contemplated by my invention are encountered in the water-soluble chemicals fraction obtained in the now generally known hydrocarbon synthesis process, involving the reduction of carbon monoxide with hydrogen in the presence of a fluidized iron catalyst. In the hydrocarbon synthesis plants now designed for commercial purposes, having capacities of the order of 6,000 barrels of liquid hydrocarbons per day, the chemicals present in mixtures of the type contemplated by the process of my invention constitute approximately 30 percent of the total water-soluble chemicals produced or about 140,000 pounds per day. Accordingly, for economic and other reasons, it is essential that these chemicals be recovered, each in as highly purified form as possible.

Mixtures typical of those with which I am concerned and the relative concentrations in which each component thereof is present are indicated below:

| Component: | Wt. percent |
|---|---|
| Butyraldehyde | 4.0 |
| Ethyl acetate | 1.4 |
| Methyl ethyl ketone | 11.1 |
| Methyl propyl ketone | 1.7 |
| Ethanol | 74.0 |
| Isopropanol | 1.4 |
| Water | 6.3 |
| Other impurities | 0.1 |

Some appreciation of the difficulties encountered in attempting to obtain any or all of the above-mentioned oxygenated organic compounds in a substantially pure form when present in such mixtures may be realized by reference to the boiling points of the pure compounds, as well as to their azeotropes either in the aqueous or anhydrous state.

| Boiling points of pure chemicals: | B. P., ° C. |
|---|---|
| Butyraldehyde | 75.7 |
| Ethyl acetate | 77.1 |
| Ethanol | 78.3 |
| Methyl ethyl ketone | 79.6 |
| Isopropanol | 82.3 |
| Methyl propyl ketone | 102.0 |

| Boiling points of azetotropes: | |
|---|---|
| Butyraldehyde-ethanol-water | 67.2 |
| Butyraldehyde-water | 68.0 |
| Ethanol-ethyl acetate-water | 70.3 |
| Ethyl acetate-water | 70.4 |
| Ethyl acetate-ethanol | 71.8 |
| Ethanol-methyl ethyl ketone-water | 73.2 |
| Methyl ethyl ketone-water | 73.2 |
| Ethanol-methyl ethyl ketone | 74.8 |
| Ethyl acetate-methyl ethyl ketone | 76.7 |
| Ethanol-methyl propyl ketone | 77.7 |
| Ethanol-methyl propyl ketone-water | 78.0 |
| Ethanol-water | 78.2 |
| Isopropanol-water | 80.4 |
| Methyl propyl ketone-water | 83.3 |

It will be readily apparent to one skilled in the art to which my invention relates that the separation in substantially pure form of even a single component from aqueous mixtures of the above type presents a formidable recovery problem. Even if water were removed from this mixture by one of several methods, fractionation of the anhydrous chemicals to yield pure products would not be practicable.

One of the chief problems in the separation of these various components, each in a substantially pure state, has been concerned with the purification of methyl ethyl ketone. Methods previously employed for drying this compound involved first distilling the crude material in the presence of water to obtain an azeotrope containing about 89 percent methyl ethyl ketone and about 11 percent water. Further separation of water from methyl ethyl ketone was then effected by salting out the latter. The resulting oil layer was withdrawn, distilled, and the remaining water removed as an azeotrope with methyl ethyl ketone. The bottoms portion, which represented the bulk of the methyl ethyl ketone, was obtained in the form of a substantially anhydrous residue. Such a method for drying methyl ethyl ketone has a number of obvious disadvantages, including the corrosion problems involved in procedures employing solutions of calcium chloride, sodium chloride, or similar brines, and the disadvantages of intermittent operation, as well as the handling of solid solutions.

Other procedures for the recovery of methyl ethyl ketone from aqueous mixtures thereof have been concerned with charging a mixture comprising methyl ethyl ketone and water to a liquid-liquid extractor where it is extracted with a suitable hydrocarbon such as, for example, n-hexane. The resulting hexane layer containing the bulk of the methyl ethyl ketone together with a relatively small percentage of water is thereafter azeotropically distilled to give a mixture of ternary and binary azeotropes, leaving a residue of substantially pure methyl ethyl ketone. While this method results in the procurement of high-quality methyl ethyl ketone, special equipment and solvents are required for this procedure, rendering it comparatively costly and complex.

The foregoing procedures are additionally objectionable because of the fact that they are limited to methyl ethyl ketone mixtures that are free from aldehydes, esters and alcohols. Such methods are capable only of drying ketone mixtures and cannot effect a separation of the individual organic components.

It is an object of my invention to provide a simple and efficient method for purifying and drying methyl ethyl ketone. It is a further object of my invention to dry and separate methyl ethyl ketone from its common organic impurities without the aid of a pre-extraction process and attendant use of solvents and extraction equipment. It is a still further object of my invention to recover and purify methyl ethyl ketone from aqueous mixtures of the type produced by the synthesis of hydrocarbons from carbon monoxide and hydrogen by first effecting an extractive distillation of said mixture with water, thereafter subjecting the oil layer, obtained from the aforesaid distillation step, to straight distillation at pressures from about 0 to about 25 p. s. i. g. to obtain a two-phase distillate, withdrawing a dry bottoms containing methyl ethyl ketone and common organic impurities, subjecting said bottoms to distillation, and withdrawing a bottoms fraction containing methyl ethyl ketone, and thereafter distilling the latter to obtain a distillate consisting essentially of pure methyl ethyl ketone.

While the process of my invention is adapted to the recovery and purification of methyl ethyl ketone present in a wide variety of mixtures containing butyraldehyde or ethyl acetate or both of these compounds, it is particularly useful in handling methyl ethyl ketone produced in hydrocarbon synthesis and which is found in certain aqueous fractions resulting therefrom. In separating the various hydrocarbon synthesis water soluble chemicals from one another, an aqueous mixture is obtained at an intermediate stage of the separation procedure which has the following approximate composition: 30–45 weight percent methyl ethyl ketone, 10–20 weight percent butyraldehyde and ethyl acetate (mixture), 10–20 weight percent methyl propyl ketone, 5–10 weight percent isopropyl alcohol, 10–20 weight percent water, and 1–10 weight percent ethanol. The difficulties encountered in attempting to separate and purify each of these components may be more fully appreciated when it is realized that methyl ethyl ketone, ethyl acetate, butyraldehyde, and ethanol all boil within 4° of one another and that in the presence of water a total of eleven different azeotropes are involved, all of which boil not more than 13° apart. Separation of methyl ethyl ketone, boiling at 79.6° C. from such mixtures is made particularly difficult, owing to the fact that ethyl acetate boils at 77.1° C., methyl ethyl ketone and ethyl acetate form an azeotrope boiling at 76.7° C., butyraldehyde boils at 75.7° C., and water forms close-boiling azeotropes with each of the compounds just mentioned.

Briefly, my invention is based on the discovery that, on distillation at atmospheric pressure of an aqueous mixture containing butyraldehyde, ethyl acetate, and methyl ethyl ketone, in which the latter is present in a concentration several times greater than the combined concentrations of butyraldehyde and ethyl acetate, the distillate on cooling separates into two phases, thus permitting a self-drying operation of the organic layer. In this connection, it should be pointed out that, in order to obtain these two phases, a minimum concentration of the butyraldehyde-ethyl acetate component should be present in the original mixture. This minimum concentration I have found to be about 5 (preferably 10) weight percent, based upon the amount of methyl ethyl ketone present. I have made the further surprising discovery that on obtaining a dry mixture of methyl ethyl ketone, methyl propyl ketone, butyraldehyde and ethyl acetate, it is possible to effect a relatively sharp separation between the two ketones and butyraldehyde and ethyl acetate. In separating the components of the dry mixture, it has been thought that pressure distillation must be employed, inasmuch as the data in the literature indicate that no reasonable difference in volatility exists between the closest boiling components (ethyl acetate and methyl ethyl ketone) at atmospheric pressure. At the same time, however, the vapor-pressure curves indicate that the key components of the organic phase, i. e., ethyl acetate and methyl ethyl ketone, should be separable (under the limits of the azeotrope formed) at pressures of from 40 to 50 p. s. i. g. I have found, however, that the experimental vapor-liquid data give a completely different result from that anticipated. Thus, for example, from two sets of determinations (8 percent and 58 percent ethyl acetate in liquid) it has been demonstrated that at atmospheric to 50 p. s. i. g. there is no effect of pressure on the separation over this range of concentrations. The most surprising feature, however, is that the separation can be made at any pressure within the aforesaid range so long as the concentration of ethyl acetate is not more than that of methyl ethyl ketone.

While it is known that methyl ethyl ketone and ethyl acetate form a constant boiling mixture comprising approximately 22 weight percent methyl ethyl ketone and 78 weight percent ethyl acetate, it has not been recognized until now that the aforesaid composition of such mixture holds true only for a specific range of ethyl acetate-methyl ethyl ketone mixtures. Thus, with ethyl acetate-methyl ethyl ketone mixtures in which the ethyl acetate content thereof is not more than about 18 weight percent, it will be found that the composition of the azeotrope produced on distillation is approximately 22 weight percent methyl ethyl ketone and 78 weight percent ethyl acetate. However, with an ethyl acetate concentration range of from about 19 weight percent up to about 50 weight percent, the composition of the overhead with respect to methyl ethyl ketone is such that the methyl ethyl ketone content of the distillate never exceeds about 5 weight percent of the methyl ethyl ketone in the feed. Or, expressed otherwise, the methyl ethyl ketone content of the overhead does not exceed about 15 weight percent. This condition favors clean up of ethyl acetate from the distillation column bottoms, while the difficulty in the rich ethyl acetate region in the top of the column is overcome by permitting a small amount of methyl ethyl ketone to pass into the distillate. Material balances indicate that, with a column having 55 plates, the loss of methyl ethyl ketone to the distillate is about 5 weight percent of that present in the feed stock, while a methyl ethyl ketone bottoms of greater than 99 weight percent purity is obtained.

Beyond ethyl acetate concentrations of about 50 weight percent, the relative volatility of methyl ethyl ketone is increased to the point where an amount in excess of 5 weight percent of that present in the feed is found in the overhead. This concentration of excess methyl ethyl ketone in the distillate increases with increasing concentrations of ethyl acetate in the feed. Accordingly, this phase of my invention is directed to the discovery that, within the aforesaid ethyl acetate concentration range of from about 19 to about 50 weight percent, the quantity of methyl ethyl ketone brought overhead on distillation of such mixtures is very substantially less than that which would be predicted from the published information on the methyl ethyl ketone content of the ethyl acetate-methyl ethyl ketone constant boiling mixture. As previously indicated, with ethyl acetate concentrations above about 50 percent, the amount of methyl ethyl ketone passing into the distillate increases so rapidly that the use of the above-discovered phenomenon is not considered practical.

According to the process of my invention, an aqueous mixture containing methyl ethyl ketone, butyraldehyde, ethyl acetate, ethanol, and isopropyl alcohol is extractively distilled with water, whereby the bulk of the alcohols is washed down the column in the form of dilute aqueous solution. In this step, the column is operated under conditions such that an aqueous overhead fraction is secured which contains butyraldehyde, ethyl acetate, and methyl ethyl ketone, together with a small quantity of light alcohols. In general, I have found that, in order to effect a satisfactory separation between butyraldehyde, ethyl acetate, and methyl ethyl ketone on the one hand and ethanol and isopropyl alcohol on the other, dilution water should be added to the column in an amount such that the concentration of water in the liquid within the column is from about 80–99 mol percent, preferably between 85 to 80 mol percent. However, when methyl propyl ketone is present in such mixture, the concentration of water in the column should be from about 95–99 mol percent in order to force the methyl propyl ketone into the distillate together with the butyraldehyde and ethyl acetate. The amount of net overhead withdrawn should be carefully controlled to avoid forcing ethanol and isopropyl alcohol overhead or butyraldehyde, ethyl acetate and ketones into the bottoms at this stage. Ordinarily, the heat input to the column should be in the range of 150–350 B. t. u. per pound of bottoms, preferably 250–300 B. t. u. per pound of bottoms. It has been my observation that the use of an excessive amount of heat impairs the efficiency of the column, since under such conditions the concentration of water in the column falls below the value I have found suitable for effecting the desired separation. For the majority of feeds, however, bottom tower temperatures of from about 95 to about 100° C. (corrected to atmospheric pressure), and top tower temperatures of 70 to 85° C., preferably 73° C., are satisfactory. The overhead stream obtained in this distillation operation is an aqueous mixture consisting predominantly of methyl ethyl ketone together with smaller quantities of butyraldehyde and ethyl acetate, which, contrary to that which would normally be expected, separates into two phases on cooling. Isopropyl alcohol and ethanol are withdrawn as a side stream near the bottom of the column in a dilute (1–10 weight percent) aqueous solution and thereafter separated from one another in accordance with a process outside the scope of this invention. The organic mixture in the overhead of this operation is next subjected to distillation in a column at pressures of from atmospheric to about 25 p. s. i. g. If butyraldehyde is present, pressures substantially in excess of 25 p. s. i. g. cause the aldehyde to polymerize.

In this operation, the feed (organic layer) is self-dried. The total overhead in this distillation generally contains from about 12–20 weight percent water at atmospheric pressure, whereas the feed contains only 5–10 weight percent water. At higher pressures, an increased concentration of water in the distillate is obtained. This column may be satisfactorily operated, i. e., the water removed from the feed thereto, by operating at pressures ranging from atmospheric to about 25 p. s. i. g., and at a top tower temperature of from about 68 to about 105° C., while a bottom temperature of from about 75 to about 112° C. at pressures of from atmospheric to about 25 p. s. i. g. may be employed. If large amounts of methyl propyl ketone are present, the bottom temperature may approach 135° C. at 25 p. s. i. g. The dry bottoms obtained from this operation and comprising butyraldehyde, ethyl acetate, and ketones is then distilled at pressures ranging from atmospheric to 25 p. s. i. g., employing a bottom temperature of from about 80 to about 135° C. and a top tower temperature of from 75 to about 110° C. Under these conditions, a split between the butyraldehyde-ethyl acetate component and methyl ethyl ketone and methyl propyl ketone, if present, is effected, the former going overhead and the two ketones being withdrawn as bottoms after which they are separated from one another by straight fractional distillation.

One embodiment of my invention is shown diagrammatically in Figure 1. Referring to the drawing, a charging stock comprising essentially an aqueous solution of butyraldehyde, ethyl acetate, methyl propyl ketone and methyl ethyl ketone, together with minor amounts of ethanol and isopropyl alcohol obtained, for example, by the hydrogenation of carbon monoxide in the presence of a fluidized iron catalyst, is introduced through line 2 into 55-plate distillation column 4 at the 35th plate, where it is fractionally distilled. Vapors rising through the column encounter a stream of water introduced at the 55th plate through line 6. Under the conditions previously set forth, the ethanol and isopropyl alcohol present in the feed stream are carried down the column and withdrawn therefrom as a dilute side stream through condenser 8 and line 10. Bottoms water is withdrawn through line 3 and partially recycled through line 5 to the process water line 6. The overhead, which consists chiefly of butyraldehyde, ethyl acetate, methyl ethyl ketone, and methyl propyl ketone, together with from about 12–20 weight percent of water, is withdrawn through line 12, condenser 14, and cooler 16, a reflux ratio to column 4 of about 8 to 1 being maintained. After cooling the net overhead to a temperature of about 38° C., the latter is led into separator 18, where the distillate separates into two phases. The lower aqueous layer is returned to column 4 at the 35th plate through line 20 and the organic layer, which contains 6 weight percent water, is fed to 30-plate column 22 through line 24 and introduced at the uppermost plate. In this column, water azeotropes of the organic compounds introduced through line 24 are taken overhead through line 26 and condenser 28 and cooled to about 38° C., after which the resulting condensate is run into separator 30, where two phases are formed. The organic layer is returned to column 22 at the 30th plate through line 32 and the water layer, which contains about 15 weight percent chemicals, is withdrawn through line 33 and returned to line 2, where it is mixed with the feed to column 4. The bottoms obtained under the conditions employed in the operation of column 22 consists of dry butyraldehyde, ethyl acetate, methyl ethyl ketone, and methyl propyl ketone. This fraction is withdrawn through line 34 and introduced into 55-plate column 36 at the 21st plate. Under the conditions previously set forth, an overhead of butyraldehyde and ethyl acetate is withdrawn from the top of column 36 through line 38 and condenser 40, a reflux to the column of about 20 to 1 being maintained through line 42. In this overhead fraction there is generally present about 15 weight percent methyl ethyl ketone or about 5 weight percent of the total methyl ethyl ketone, so long as the ethyl acetate content of the feed is not more than about 50 weight percent. A bottoms fraction consisting essentially of methyl ethyl ketone and methyl propyl ketone and containing less than 1 weight percent of butyraldehyde and ethyl acetate is withdrawn through line 44 and the two ketones separated into their substantially pure components by means of straight fractional distillation.

In the above-mentioned drawing, reference to certain equipment, such as pumps, reboilers, gauges, and the like, which obviously would be necessary to operate the process, has been intentionally omitted. Only sufficient equipment has been diagrammatically shown to illustrate the process, and it is intended that no undue limitations be read into my invention by reference to the drawing and description thereof.

Figure 2:
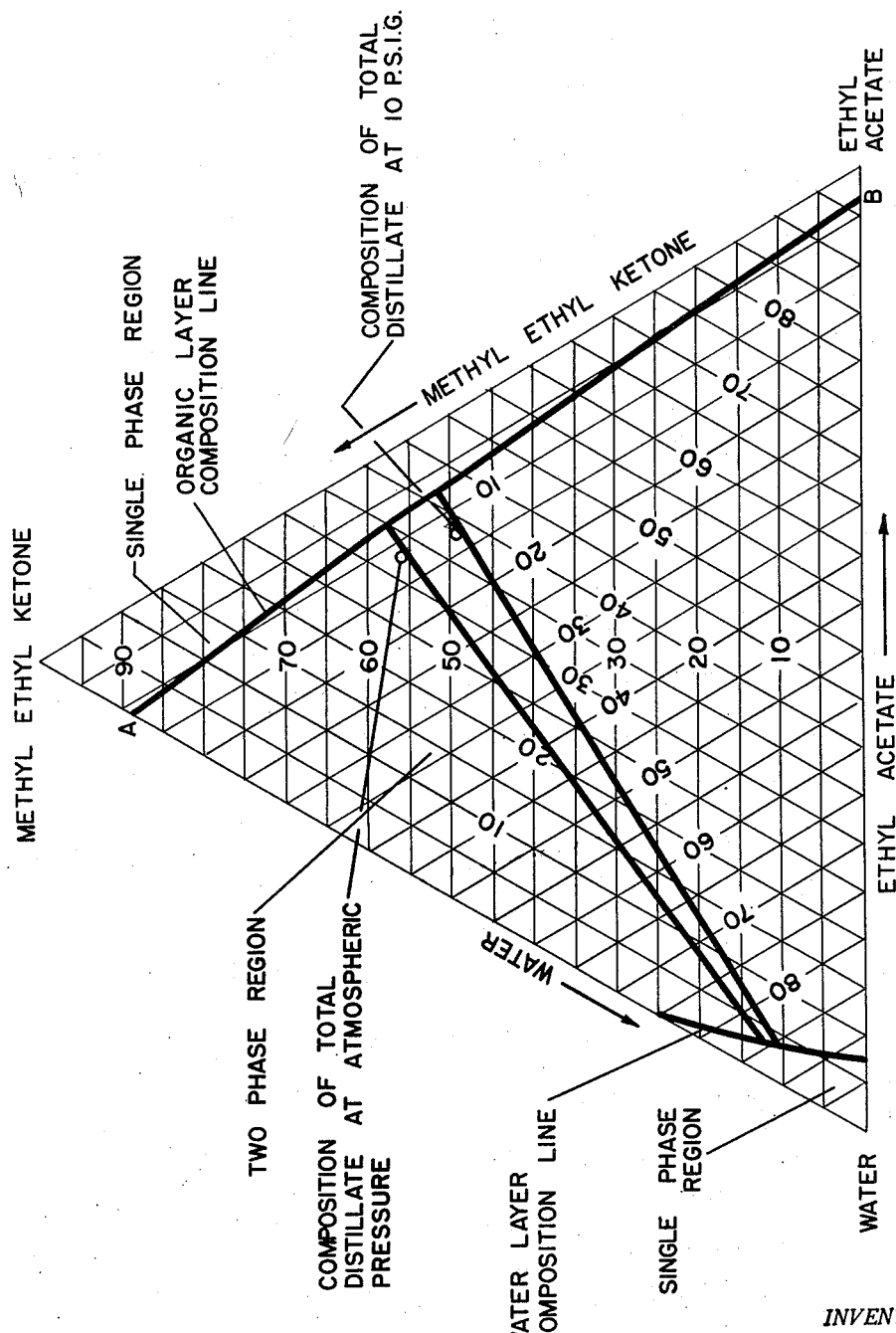

The composition of the two phases which appear on cooling the distillate in separator 18 to room temperature (about 28° C.) is shown in Figure 2, for the case where no methyl propyl ketone is present. In this system, butyraldehyde and ethyl acetate are equivalent, since they have the same solubility in water and are both completely miscible with methyl ethyl ketone and methyl propyl ketone. It is to be noted that the organic layer resulting from this phase separation contains only from about 5 to about 10 weight percent water, depending upon the relative amounts of chemicals present, although the total distillate may contain 15–20 weight percent of water. It should also be noted that the organic phase so obtained contains less than the calculated (theoretical) water content, as shown by the fact that line AB in the ternary diagram of Figure 2 is not straight but is curved. This is a distinct advantage, since the succeeding drying step in column 22 is improved greatly by a slight decrease in the water content of the feed. Thus, because of the fact that under the conditions employed the theoretical amount of water does not dissolve in the organic phase, the increase in drying-column efficiency can amount to 20 percent or more, expressed in the form of steam consumption, column size requirements, etc. If methyl propyl ketone is present in the distillate from column 4, an even further reduction of water content in the organic layer is achieved, and the efficiency of column 22 is markedly improved. In this case also, the quantity of water remaining in the organic layer is less than the theoretical amount. This property of such mixture to take up less than the expected quantity of water is unique with the particular systems dealt with herein and is not shown by similar systems, such as butyraldehyde-ethyl acetate-water and methyl butyl ketone-butanol-water. This characteristic is further illustrated by the fact that, if two homogeneous phases are mixed, one consisting of 96.5 pounds of ethyl acetate and 3.5 pounds of water and the other consisting of 88.3 pounds of methyl ethyl ketone and 11.7 pounds of water, a two-phase mixture is obtained, the organic layer of which contains 6.8 weight percent water. Since the total water present in the organic phases prior to mixing is 7.6 weight percent, this represents a reduction of about 10 weight percent in the total water dissolved in the organic phase.

The organic phase in the distillate from column 4 is self-dried, as previously explained, by azeotropic distillation in column 22. It is known that the methyl ethyl ketone-water azeotrope, when distilled at atmospheric pressure and condensed, does not separate into two phases but that increased pressure will cause sufficient water enrichment of the azeotrope to bring about a phase separation. It has been found, however, that for mixtures of water soluble hydrocarbon synthesis chemicals obtained over a wide range of synthesis conditions that the distillate from this column contains sufficient light, relatively insoluble materials, such as butyraldehyde and ethyl acetate, to cause separation into two phases and thus to permit an efficient self-drying operation at atmospheric pressure. The relationships between the total distillate and the two layers formed are again shown in Figure 2. The fact that less than the theoretical amount of water dissolves in the distillate organic layer further increases the drying efficiency in this column, since the water removed in the distillate water layer per pound of total distillate is greater than the theoretical quantity. Thus, since the aqueous phase so removed contains a large amount of water, i. e., about 85 weight percent, only a small stream need be removed to dry the methyl ethyl ketone-methyl propyl-ketone-butyraldehyde-ethyl acetate fraction.

It will be apparent, in view of the foregoing description, that the process of my invention may be modified in numerous ways without materially departing from the scope thereof. Thus, while the application of my invention has been described principally in connection with the separation of methyl ethyl ketone from aqueous mixtures containing butyraldehyde or ethyl acetate or both of these compounds, where these components are present in proportions typical of those found in the water-soluble chemicals stream obtained from the hydrocarbon synthesis process, it is to be strictly understood that my invention is equally applicable to other aqueous mixtures in which the concentration of the butyraldehyde-ethyl acetate component in the mixture ranges from about 19 to not more than about 50 weight percent. Also, while I have shown that the organic layer in the distillate obtained from column 4 is dried by means of azeotropic distillation, other means of accomplishing this step are contemplated, for example, by the use of solid dehydrating agents, such as anhydrous magnesium sulfate, sodium sulfate, etc. Additionally, straight stripping of the mixture may be employed to remove all of the water therefrom; or, if desired, the water can be removed by azeotroping with a suitable hydrocarbon.

This application is a continuation-in-part of my copending U. S. application Serial No. 171,389, filed June 30, 1950, now abandoned.

I claim:

1. In a process for the recovery of substantially anhydrous methyl ethyl ketone present in a single-phase organic mixture containing water, butyraldehyde and ethyl acetate, the improvement which comprises removing the water from said mixture and thereafter subjecting the resulting dried mixture, in which the total ethyl acetate and butyraldehyde concentration ranges from about 19 to not more than about 50 weight percent, to distillation at a top tower temperature of from about 75 to about 110° C. at pressures ranging from atmospheric to about 25 p. s. i. g. to obtain as an overhead all of the butyraldehyde-ethyl acetate component and not more than about 5 weight percent of the methyl ethyl ketone in said dried mixture and a bottoms of dry methyl ethyl ketone substantially free from said butyraldehyde-ethyl acetate component.

2. In a process for obtaining substantially anhydrous methyl ethyl ketone from a single-phase aqueous mixture containing ethyl and isopropyl alcohols, butyraldehyde, and ethyl acetate, the steps which comprise subjecting said mixture, wherein the total concentration of the butyraldehyde-ethyl acetate component in the mixture is a minimum of 5 weight percent, based on the methyl ethyl ketone, to fractional distillation at substantially atmospheric pressure in a column in which a heat input of from about 150–350 B. t. u. per pound of bottoms is employed to give a bottom tower temperature of from about 95° C. to about 100° C. and an overhead temperature of from about 70° C. to about 85° C., introducing water into said column countercurrently to the flow of the resulting vaporous mixture in an amount such that the concentration of water in the liquid at any point in the column is from about 80 to about 99 mol percent, withdrawing an overhead containing substantially all of the methyl ethyl ketone, butyraldehyde, and ethyl acetate present in the original feed mixture, allowing said overhead to separate into an aqueous phase and an organic phase containing solubilized water, drying said organic phase to give a mixture in which the total concentration of the butyraldehyde-ethyl acetate component in the mixture ranges from about 19 to not more than about 50 weight percent, and separating the ketone component from butyraldehyde and ethyl acetate present in said phase by means of fractional distillation at pressures ranging from about atmospheric to about 25 p. s. i. g.

3. The process of claim 2, in which the initial single-phase aqueous mixture contains methyl propyl ketone and water is introduced into the column employed in the extractive distillation step in an amount such that the concentration of water in the liquid at any point in the column is from about 95 to about 99 mol percent.

4. In a process for the separation of methyl ethyl ketone from an anhydrous mixture containing ethyl acetate, the improvement which comprises subjecting said mixture, wherein the concentration of ethyl acetate ranges from about 19 to not more than about 50 weight percent to distillation at a top tower temperaure of from about 75 to about 110° C. at pressures ranging from atmospheric to about 50 p. s. i .g. to obtain an overhead containing all of the ethyl acetate originally present and not more than about 5 weight percent of the methyl ethyl ketone in said anhydrous mixture and a bottoms of dry methyl ethyl ketone substantially free from ethyl acetate.

5. In a process for the separation of methyl ethyl ketone from an anhydrous mixture containing butyraldehyde, the improvement which comprises subjecting said mixture, wherein the concentration of butyraldehyde ranges from about 19 to not more than about 50 weight percent, to distillation at a top tower temperature of from about 75 to about 110° C. at pressures ranging from atmospheric to about 25 p. s. i. g. to obtain an overhead containing all of the butyraldehyde originally present and not more than about 5 weight percent of the methyl ethyl ketone in said anhydrous mixture and a bottoms of dry methyl ethyl ketone substantially free from butyradehyde.

6. In a process for obtaining substantially anhydrous methyl ethyl ketone from a single-phase aqueous mixture containing ethyl and isopropyl alcohols, butyraldehyde, and ethyl acetate, the steps which comprise subjecting said mixture, in which the total concentration of the butyraldehyde-ethyl acetate component in the mixture is a minimum of about 5 weight percent based upon the amount of methyl ethyl ketone present, to fractional distillation at substantially atmospheric pressure and at an overhead temperature of from about 70° to about 85° C., withdrawing a distillate containing substantially all of the methyl ethyl ketone, butyraldehyde and ethyl acetate present in the original feed mixture, and allowing said overhead to separate into an aqueous phase and an organic phase containing solubilized water, said organic phase containing said butyraldehyde-ethyl acetate component in a concentration of from about 19 to about 50 weight percent.

References Cited in the file of this patent

UNITED STATES PATENTS

| | | |
|---|---|---|
| 1,835,700 | Edmonds et al. | Dec. 8, 1931 |
| 1,862,706 | Ricard et al. | June 14, 1932 |
| 2,411,437 | Lake | Nov. 19, 1946 |
| 2,454,447 | Harney et al. | Nov. 23, 1948 |
| 2,575,244 | Carlson et al. | Nov. 13, 1951 |
| 2,607,719 | Eliot et al. | Aug. 19, 1952 |